(12) United States Patent
Yoo et al.

(10) Patent No.: US 11,505,721 B2
(45) Date of Patent: Nov. 22, 2022

(54) STRETCHABLE ADHESIVE FILM AND DISPLAY DEVICE COMPRISING SAME

(71) Applicant: LG CHEM, LTD., Seoul (KR)

(72) Inventors: Han Sol Yoo, Daejeon (KR); Hyun Cheol Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 17/057,369

(22) PCT Filed: Jun. 5, 2019

(86) PCT No.: PCT/KR2019/006798
§ 371 (c)(1),
(2) Date: Nov. 20, 2020

(87) PCT Pub. No.: WO2019/235843
PCT Pub. Date: Dec. 12, 2019

(65) Prior Publication Data
US 2021/0189185 A1    Jun. 24, 2021

(30) Foreign Application Priority Data
Jun. 5, 2018 (KR) .......................... 10-2018-0064864

(51) Int. Cl.
*C09J 7/25* (2018.01)
*C09J 7/38* (2018.01)
(Continued)

(52) U.S. Cl.
CPC ................... *C09J 7/25* (2018.01); *B32B 7/06* (2013.01); *B32B 7/12* (2013.01); *B32B 25/08* (2013.01);
(Continued)

(58) Field of Classification Search
CPC ....... C09J 7/25; C09J 7/22; C09J 7/241; C09J 7/385; C09J 2203/318; C09J 2301/122;
(Continued)

(56) References Cited

U.S. PATENT DOCUMENTS 6,524,675 B1    2/2003    Mikami et al.
9,624,404 B2    4/2017    Jozuka et al.
(Continued)

FOREIGN PATENT DOCUMENTS

EP    0279777 A1    8/1988
JP    6-177098 A    6/1994
(Continued)

OTHER PUBLICATIONS

International Search Report issued for International Application No. PCT/KR2019/006798 dated Sep. 3, 2019, 5 pages.
(Continued)

*Primary Examiner* — Patricia L. Nordmeyer
(74) *Attorney, Agent, or Firm* — Rothwell, Figg, Ernst & Manbeck, P.C.

(57) ABSTRACT

The present disclosure relates to a stretchable adhesive film comprising a substrate layer comprising an elastomer; and a first adhesive layer provided on one surface of the substrate layer, wherein the stretchable adhesive film satisfies Equation 1, and a display device comprising the same.

9 Claims, 1 Drawing Sheet

(51) Int. Cl.
*B32B 25/08* (2006.01)
*B32B 25/20* (2006.01)
*C09J 7/22* (2018.01)
*C09J 7/24* (2018.01)
*B32B 7/06* (2019.01)
*B32B 7/12* (2006.01)
*B32B 25/16* (2006.01)

(52) U.S. Cl.
CPC ............. *B32B 25/16* (2013.01); *B32B 25/20* (2013.01); *C09J 7/22* (2018.01); *C09J 7/241* (2018.01); *C09J 7/385* (2018.01); *B32B 2250/03* (2013.01); *B32B 2307/546* (2013.01); *B32B 2307/732* (2013.01); *B32B 2405/00* (2013.01); *B32B 2457/206* (2013.01); *C09J 2203/318* (2013.01); *C09J 2301/122* (2020.08); *C09J 2301/124* (2020.08); *C09J 2301/308* (2020.08); *C09J 2301/312* (2020.08); *C09J 2409/006* (2013.01); *C09J 2421/00* (2013.01); *C09J 2423/166* (2013.01); *C09J 2433/00* (2013.01); *C09J 2453/006* (2013.01); *C09J 2475/00* (2013.01); *C09J 2483/00* (2013.01); *C09J 2483/006* (2013.01); *Y10T 428/1457* (2015.01)

(58) Field of Classification Search
CPC ............ C09J 2301/124; C09J 2301/308; C09J 2301/312; C09J 2409/006; C09J 2421/00; C09J 2423/166; C09J 2433/00; C09J 2453/006; C09J 2475/00; C09J 2483/00; C09J 2483/006; C09J 133/08; C09J 183/08; C09J 175/04; C09J 183/04; C09J 11/00; C09J 133/00; B32B 7/06; B32B 7/12; B32B 25/08; B32B 25/16; B32B 25/20; B32B 2250/03; B32B 2307/546; B32B 2307/732; B32B 2405/00; B32B 2457/206; Y10T 428/1457; C08F 220/1808; C08G 77/20; C08G 77/24; C08G 77/80; C08G 77/04
See application file for complete search history.

(56) References Cited

U.S. PATENT DOCUMENTS

| | | |
|---|---|---|
| 2008/0311332 A1 | 12/2008 | Sakurai et al. |
| 2012/0094051 A1* | 4/2012 | Chang ................ B32B 3/30 156/289 |
| 2014/0037883 A1 | 2/2014 | Lavature |
| 2016/0177146 A1 | 6/2016 | Mun et al. |
| 2019/0022986 A1* | 1/2019 | Nemoto ................ C08L 83/04 |

FOREIGN PATENT DOCUMENTS

| | | |
|---|---|---|
| JP | 2006-299283 A | 11/2006 |
| JP | 2009-192749 A | 8/2009 |
| JP | 2012-167247 A | 9/2012 |
| JP | 2013-155243 A | 8/2013 |
| JP | 2014-210897 A | 11/2014 |
| JP | 5840200 B2 | 1/2016 |
| JP | 2016-023278 A | 2/2016 |
| JP | 2016-029121 A | 3/2016 |
| JP | 2017-171772 A | 9/2017 |
| KR | 10-2007-0089851 A | 9/2007 |
| KR | 10-2016-0076974 A | 7/2016 |

OTHER PUBLICATIONS

Office Action issued for Japanese Patent Application No. 2020-558616 dated May 17, 2022, with machine English translation, 6 pages.

\* cited by examiner

【FIG. 1】
【FIG. 2】
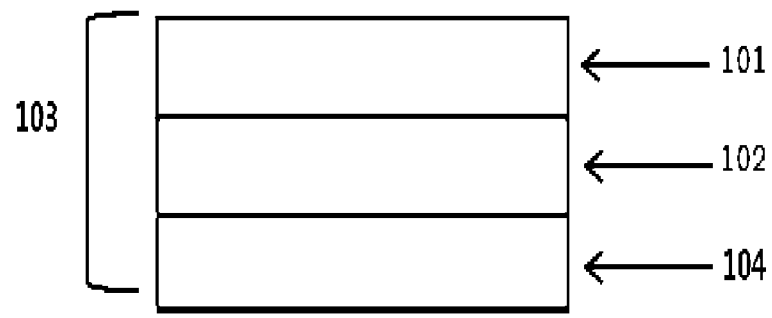

STRETCHABLE ADHESIVE FILM AND DISPLAY DEVICE COMPRISING SAME

TECHNICAL FIELD

This application is a 35 U.S.C. 371 National Phase Entry Application from PCT/KR2019/006798 filed on Jun. 5, 2019, designating the United States, which claims priority to and the benefits of Korean Patent Application No. 10-2018-0064864, filed with the Korean Intellectual Property Office on Jun. 5, 2018, the entire contents of which are incorporated herein by reference.

The present application relates to a stretchable adhesive film and a display device comprising the same.

BACKGROUND OF THE INVENTION

As display devices in the art, unbreakable displays, curved displays, bended displays, foldable displays, rollable displays and the like have been developed.

A currently commercialized stage is a bended display-type mobile field, and a mobile field using a foldable display is expected to emerge in full. In addition, the rate of development on the electric field using a pOLED is also remarkable.

Particularly, a stretchable display has been developed recently, and demands thereon are increasing. In order for a display to have stretchability, elongation in both two axes needs to be achieved unlike an existing display device that is strained in simply one direction.

In order to obtain a stretchable display, all films forming the display need to be stretchable, and particularly, an adhesive and a substrate supporting these films also need to have excellent stretchability and strain property.

Particularly, as a field of application of a stretchable display, a wearable display having a form of using a fiber, and a medical purpose display have been proposed starting from a touch screen panel.

Meanwhile, existing adhesives and substrates used as a display support do not have excellent stretchability and strain property, and particularly in a structure in which an adhesive and a substrate are laminated, it is difficult to recover when strained.

Accordingly, in view of the above, development of an adhesive film having both an adhesive and a substrate layer capable of elongating in a biaxial direction while developing adhesive strength required for fixing the substrate, having a property of excellently recovering to the original state after elongating these, and usable in a stretchable display has been required.

BRIEF SUMMARY OF THE INVENTION

The present application is directed to providing a stretchable adhesive film and a display device comprising the same.

One embodiment of the present application provides a stretchable adhesive film comprising a substrate layer comprising an elastomer; and a first adhesive layer provided on one surface of the substrate layer, wherein the stretchable adhesive film satisfies the following Equation 1.

$$0.95 \leq a2/a1 \leq 1 \quad \text{[Equation 1]}$$

In Equation 1, a1 is a stress value of the stretchable adhesive film at X1 under 25±2° C. and 50±5% RH (relative humidity), a2 is a stress value at X1 after evaluating elongation/recovery on the stretchable adhesive film 10,000 times with a 20% strain under 25±2° C. and 50±5% RH (relative humidity), X1 is a strain value (%) applied to the stretchable adhesive film, the strain means an elongational strain, and X1 is 20.

Another embodiment of the present application provides a display device comprising the stretchable adhesive film according to one embodiment of the present application; a deposition layer provided on one surface of the stretchable adhesive film; and a substrate film provided on a surface opposite to the surface adjoining the stretchable adhesive film of the deposition layer, wherein the first adhesive layer of the stretchable adhesive film and the deposition layer adjoin each other.

Lastly, another embodiment of the present application provides a wearable display device comprising the stretchable adhesive film according to one embodiment of the present application.

Advantageous Effects

A stretchable adhesive film according to one embodiment of the present application has excellent adhesive strength with a substrate, and particularly, has a property of excellent fatigue durability by the stretchable adhesive film satisfying Equation 1, and as a result, a property of recovering to the original state is obtained even when a strain of 20% level is applied.

The stretchable adhesive film according to one embodiment of the present application has properties as above, and when used in a stretchable display device afterward, an ability to recover to the original state is excellent, and a role of supporting a film forming a display is particularly superior by having excellent durability.

BRIEF DESCRIPTION OF DRAWINGS

FIG. 1 is a diagram illustrating a lamination structure of a stretchable adhesive film according to one embodiment of the present application.

FIG. 2 is a diagram illustrating a lamination structure of a stretchable adhesive film according to another embodiment of the present application.

REFERENCE NUMERAL

101: First Adhesive Layer
102: Substrate Layer
103: Stretchable Adhesive Film
104: Second Adhesive Layer

DETAILED DESCRIPTION OF THE INVENTION

Hereinafter, the present disclosure will be described in more detail.

In the present specification, a description of a certain part "including" certain constituents means capable of further including other constituents, and does not exclude other constituents unless particularly stated on the contrary.

Embodiments of the present disclosure will be described in detail with reference to accompanying drawings so that those skilled in the art may readily implement the present disclosure. However, the present disclosure may be embodied in various different forms, and is not limited to the embodiments described herein.

One embodiment of the present application provides a stretchable adhesive film comprising a substrate layer comprising an elastomer; and a first adhesive layer provided on one surface of the substrate layer, wherein the stretchable adhesive film satisfies the following Equation 1.

$$0.95 \leq a2/a1 \leq 1 \quad \text{[Equation 1]}$$

In Equation 1, a1 is a stress value of the stretchable adhesive film at X1 under 25±2° C. and 50±5% RH (relative humidity), a2 is a stress value at X1 after evaluating elongation/recovery on the stretchable adhesive film 10,000 times with a 20% strain under 25±2° C. and 50±5% RH (relative humidity), X1 is a strain value (%) applied to the stretchable adhesive film, the strain means an elongational strain, and X1 is 20.

The stretchable adhesive film according to one embodiment of the present application has excellent adhesive strength with a substrate, and particularly, has a property of excellent fatigue durability by the stretchable adhesive film satisfying Equation 1, and as a result, a property of recovering to the original state is obtained even when a strain of 20% level is applied.

By the value of a2/a1 satisfying the range of Equation 1, the stretchable adhesive film may maintain the same state as the initial state even when repeating elongation/recovery evaluation 10,000 times, and as a result, a property of maintaining constant fatigue durability is obtained.

The stress value (a1 or a2) of the stretchable adhesive film at a specific strain (X1) is a value varying depending the content/type of a material included in the first adhesive layer and the substrate layer forming the stretchable adhesive film, and means a value measured at 25° C. using a tensile test measurement device. As the tensile test measurement device, a universal testing machine (UTM), a texture analyzer and the like are used, however, the tensile test measurement device is not limited thereto as long as it is a device capable of conducting a tensile test.

In one embodiment of the present application, as for the a1 value, both ends of the stretchable adhesive film are fixed in a length direction so that the width becomes 25 mm and the length becomes 165 mm under 25±2° C. and 50±5% RH (relative humidity), and the stretchable adhesive film is elongated to X1 at a rate of 100 mm/min using a texture analyzer, and then recovered to the initial state in the opposite direction at a rate of 100 mm/min. Herein, the stress value reaching X1 is defined as a1.

In one embodiment of the present application, as for the a2 value, both ends of the stretchable adhesive film are fixed in a length direction so that the width becomes 25 mm and the length becomes 165 mm under 25±2° C. and 50±5% RH (relative humidity), elongation and recovery are applied 10,000 times up to a 20% strain in a length direction at a rate of once per second. After that, the stretchable adhesive film is elongated to X1 at a rate of 100 mm/min using a texture analyzer, and then recovered to the initial state in the opposite direction at a rate of 100 mm/min. Herein, the stress value reaching X1 is defined as a2.

In the present application, the strain comprises an elongational strain, and the elongational strain means being strained by elongation when applying a force to an object. In other words, the 20% strain means applying an elongational strain, and means being strained, that is, 20% elongated, compared to before applying a force to the object. In other words, the elongational strain may be defined by the following Equation 2 when an initial length is defined by L0, and an elongated length is defined by L.

$$(L-L0)/L0 \times 100 \quad \text{[Equation 2]}$$

In one embodiment of the present application, a1 is a stress value of the stretchable adhesive film at X1 under 25±2° C. and 50±5% RH (relative humidity), specifically satisfies the range of 0.1 MPa≤a1≤10 MPa, and may satisfy preferably 0.1 MPa≤a1≤8 MPa and more preferably 0.1 MPa≤a1≤5 MPa.

In one embodiment of the present application, a2 is a stress value at X1 after evaluating elongation/recovery on the stretchable adhesive film 10,000 times with a 20% strain under 25±2° C. and 50±5% RH (relative humidity), specifically satisfies the range of 0.1 MPa≤a2≤9 MPa, and may satisfy preferably 0.1 MPa≤a2≤7 MPa and more preferably 0.1 MPa≤a2≤4 MPa.

In one embodiment of the present application, X1 is a strain value (%) applied to the stretchable adhesive film, and satisfies 20.

In one embodiment of the present application, when satisfying the ranges of Equation 1 at X1, force of restoration is particularly superior, and when used in a display device afterward, properties of long lifetime and excellent durability are obtained. When the ranges are outside the ranges of Equation 1 at X1, force of restoration is not favorable, and a property of poor durability is resulted when used in a stretchable display device afterward.

In one embodiment of the present application, the elastomer means a polymer having a property of being stretched when pulled by applying an external force, and returning to its original length when removing the external force.

In the stretchable adhesive film provided in one embodiment of the present application, the elastomer comprises one or more selected from the group consisting of silicone rubber, styrene butadiene rubber (SBR), butadiene rubber (BR), nitrile rubber and ethylene propylene diene monomer rubber (EPDM).

In the stretchable adhesive film provided in one embodiment of the present application, the silicone rubber comprises one or more selected from the group consisting of methyl silicone (MQ), vinyl-methyl-silicone (VMQ), phenyl-vinyl-methyl-silicone (PVMQ) and fluoro-vinyl-methyl-silicone (FVMQ).

In another embodiment, the silicone rubber may comprise methyl silicone (MQ) or vinyl-methyl-silicone (VMQ).

By the substrate layer comprising the elastomer, restoration is very superior when applying an external force and then removing the external force, and durability that is a property of being not breakable is superior even when applying an external force of 100% or greater.

In one embodiment of the present application, the substrate layer comprising the elastomer may further comprise a silane coupling agent.

When the substrate layer according to the present application further comprises the silane coupling agent, a property of increasing adhesion with the first adhesive layer is obtained.

In one embodiment of the present application, vinylsilane, epoxysilane, methacrylsilane or the like may be used as the silane coupling agent, and 0.01 parts by weight to 3 parts by weight may be used with respect to 100 parts by weight of the elastomer. Examples of such a silane coupling agent compound may comprise vinyltrimethoxysilane, vinyltriethoxysilane, γ-glycidoxypropyltrimethoxysilane, γ-methacryloxypropyltrimethoxysilane or the like, and these may be used either alone or as a mixture.

In the stretchable adhesive film provided in one embodiment of the present application, the substrate layer has a thickness of greater than or equal to 60 μm and less than or equal to 150 μm.

In another embodiment, the substrate layer may have a thickness of greater than or equal to 60 μm and less than or equal to 150 μm, preferably greater than or equal to 65 μm and less than or equal to 150 μm, and more preferably greater than or equal to 70 μm and less than or equal to 150 μm.

When the substrate layer thickness satisfies the above-mentioned range, a property of excellent durability is obtained even when conducting elongation/recovery evaluation 10,000 times, and adhesive strength with the first adhesive layer and/or the second adhesive layer is superior.

The substrate layer thickness means a thickness in a direction in which the substrate layer and the first adhesive layer are laminated.

The stretchable adhesive film provided in one embodiment of the present application comprises a second adhesive layer on a surface opposite to the surface adjoining the first adhesive layer of the substrate layer.

In one embodiment of the present application, the first adhesive layer and the second adhesive layer may be the same.

In one embodiment of the present application, the first adhesive layer and the second adhesive layer may be different.

Hereinafter, the first adhesive layer will be described, and descriptions on the second adhesive layer are the same as the following descriptions on the first adhesive layer.

In the stretchable adhesive film provided in one embodiment of the present application, the first adhesive layer comprises one or more adhesives selected from the group consisting of an acryl-based adhesive, a silicone-based adhesive, a urethane-based adhesive and a rubber-based adhesive.

In one embodiment of the present application, the first adhesive layer may comprise a polymer comprising one or more selected from the group consisting of an acrylate-based resin; and polysiloxane.

The polymer is a polymer obtained by polymerizing two or more types of different monomers, and in the polymer, two or more types of monomers may be randomly or regularly arranged.

The polymer may comprise a random polymer having monomers being mixed with each other without order, a block polymer having arranged blocks being repeated in a certain interval, or an alternating polymer having a form in which monomers are alternately repeated and polymerized, and the polymer comprising one or more selected from the group consisting of an acrylate-based resin; and polysiloxane according to one embodiment of the present application may be a random polymer, a block polymer or an alternating polymer.

In one embodiment of the present application, the acrylate-based resin may comprise a (meth)acrylate-based resin having a weight average molecular weight of 100,000 g/mol to 5,000,000 g/mol.

The weight average molecular weight is one of an average molecular weight in which a molecular weight is not uniform and a molecular weight of a certain polymer material is used as a standard, and is a value obtained by averaging molecular weights of component molecular species of a polymer compound having molecular weight distribution by a weight fraction.

The weight average molecular weight may be measured through a gel permeation chromatography (GPC) analysis.

In the present specification, the (meth)acrylate means comprising both acrylate and methacrylate. Examples of the (meth)acrylate-based resin may comprise a copolymer of a (meth)acrylic acid ester-based monomer and a crosslinking functional group-containing monomer.

The (meth)acrylic acid ester-based monomer is not particularly limited, and examples thereof may comprise an alkyl (meth)acrylate, and more specifically, may comprise one, two or more types of, as a monomer having an alkyl group with 1 to 12 carbon atoms, pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate and decyl (meth)acrylate.

The crosslinking functional group-containing monomer is not particularly limited, and examples thereof may comprise one, two or more types of a hydroxyl group-containing monomer, a carboxyl group-containing monomer and a nitrogen-containing monomer.

Examples of the hydroxyl group-containing monomer may comprise 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate or the like.

Examples of the carboxyl group-containing monomer may comprise (meth)acrylic acid, 2-(meth)acryloyloxyacetic acid, 3-(meth)acryloyloxypropionic acid, 4-(meth)acryloyloxybutyric acid, an acrylic acid dimer, itaconic acid, maleic acid, maleic anhydride or the like.

Examples of the nitrogen-containing monomer may comprise (meth)acrylonitrile, N-vinyl pyrrolidone, N-vinyl caprolactam or the like.

To the (meth)acrylate-based resin, at least one of vinyl acetate, styrene and acrylonitrile may be further copolymerized in terms of enhancing other functionality such as compatibility.

In one embodiment of the present application, the acrylate-based resin may be selected from the group consisting of an alkyl (meth)acrylate, a hydroxyalkyl acrylate and a nitrogen-containing monomer.

The alkyl acrylate and the alkyl methacrylate may comprise, as a monomer having an alkyl group with 1 to 12 carbon atoms, one, two or more types of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate and decyl (meth)acrylate.

The hydroxyalkyl acrylate may comprise 2-hydroxyethyl acrylate, 2-hydroxypropyl acrylate, 4-hydroxybutyl acrylate, 6-hydroxyhexyl acrylate, 8-hydroxyoctyl acrylate, 2-hydroxymethylene glycol acrylate, 2-hydroxypropylene glycol acrylate or the like.

The nitrogen-containing monomer may comprise N-vinyl pyrrolidone (VP).

In one embodiment of the present application, the polysiloxane has a chain of siloxane bonds (—Si—O bonds), and may comprise polyorganosiloxane.

In one embodiment of the present application, the polysiloxane may be polydimethyl siloxane (PDMS).

In one embodiment of the present application, the first adhesive layer may comprise an adhesive composition having a low glass transition temperature (Tg) value, and specifically, the adhesive composition may have a glass transition temperature of 40° C. or lower, preferably 45° C. or lower, and more preferably 50° C. or lower.

When the adhesive composition of the first adhesive layer has the above-mentioned glass transition temperature range, the range of linear viscoelastic range (LVR) is formed to be wide, and as a result, force of restoration of the stretchable adhesive film is excellent afterward.

In the stretchable adhesive film provided in one embodiment of the present application, the first adhesive layer has a thickness of greater than or equal to 10 μm and less than or equal to 100 μm.

In another embodiment, the first adhesive layer may have a thickness of greater than or equal to 10 μm and less than or equal to 100 μm, preferably greater than or equal to 15 μm and less than or equal to 90 μm, and more preferably greater than or equal to 15 μm and less than or equal to 80 μm.

When the first adhesive layer has the above-mentioned thickness range, adhesive strength with the substrate layer is particularly superior, and recovery when applying an external force is particularly superior.

In the stretchable adhesive film provided in one embodiment of the present application, the stretchable adhesive film has a thickness of greater than or equal to 70 μm and less than or equal to 250 μm.

In another embodiment, the stretchable adhesive film may have a thickness of greater than or equal to 70 μm and less than or equal to 250 μm, preferably greater than or equal to 80 μm and less than or equal to 200 μm, and more preferably greater than or equal to 110 μm and less than or equal to 175 μm.

When the thickness of the stretchable adhesive film has the above-mentioned thickness range, durability is superior when used in a display device afterward, and recovery when applying an external force is particularly superior.

In one embodiment of the present application, the first adhesive layer may further comprise one or more selected from the group consisting of a crosslinking compound, a dispersant, a silane coupling agent, a photocuring agent, a thermocuring agent, a metal salt and a tackifier.

According to one embodiment of the present specification, the crosslinking compound may comprise one or more types selected from the group consisting of a compound obtained by esterifying a polyalcohol such as hexanediol di(meth)acrylate, ethylene glycol di(meth)acrylate, polyethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethylphthalic acid, propylene glycol di(meth)acrylate having 2 to 14 propylene groups, dipentaerythritol penta(meth)acrylate, dipentaerythritol hexa(meth)acrylate or a mixture of an acidic modification of dipentaerythritol penta(meth)acrylate and dipentaerythritol hexa(meth)acrylate (TO-2348, TO-2349 of TOAGOSEI Co., Ltd. as a product name) with α,β-unsaturated carboxylic acid; a compound obtained by adding (meth)acrylic acid to a compound containing a glycidyl group such as a trimethylolpropane triglycidyl ether acrylic acid adduct or a bisphenol A diglycidyl ether acrylic acid adduct; an ester compound of a compound having a hydroxyl group or an ethylenic unsaturated bond and a polycarboxylic acid, or an adduct with polyisocyanate such as a phthalic acid diester of β-hydroxyethyl(meth)acrylate or a toluene diisocyanate adduct of β-hydroxyethyl (meth) acrylate; a (meth)acrylic acid alkyl ester such as methyl (meth)acrylate, ethyl (meth)acrylate, butyl (meth)acrylate or 2-ethylhexyl (meth)acrylate; and 9,9'-bis[4-(2-acryloyloxyethoxy)phenyl]fluorene. However, the crosslinking compound is not limited thereto, and general compounds known in the art may be used.

According to one embodiment of the present specification, the photocuring agent may be substituted with one, two or more substituents selected from the group consisting of triazine-based compounds, biimidazole compounds, acetophenone-based compounds, O-acyloxime-based compounds, thioxanthone-based compounds, phosphine oxide-based compounds, coumarin-based compounds and benzophenone-based compounds.

Specifically, according to one embodiment of the present specification, the photocuring agent may use a triazine-based compound such as 2,4-trichloromethyl-(4'-methoxyphenyl)-6-triazine, 2,4-trichloromethyl-(4'-methoxystyryl)-6-triazine, 2,4-trichloromethyl-(bifluonyl)-6-triazine, 2,4-trichloromethyl-(3',4'-dimethoxyphenyl)-6-triazine, 3-{4-[2,4-bis(trichloromethyl)-s-triazin-6-yl]phenylthio}propanoic acid, 2,4-trichloromethyl-(4'-ethylbiphenyl)-6-triazine or 2,4-trichloromethyl-(4'-methylbiphenyl)-6-triazine; a biimidazole-based compound such as 2,2'-bis(2-chlorophenyl)-4,4',5,5'-tetra phenyl biimidazole or 2,2'-bis(2,3-dichlorophenyl)-4,4',5,5'-tetraphenylbiimidazole; an acetophenone-based compound such as 2-hydroxy-2-methyl-1-phenylpropan-1-one, 1-(4-isopropyl phenyl)-2-hydroxy-2-methyl propan-1-one, 4-(2-hydroxyethoxy)-phenyl (2-hydroxy)propyl ketone, 1-hydroxycyclohexyl phenyl ketone, 2,2-dimethoxy-2-phenyl acetophenone, 2-methyl-(4-methylthiophenyl)-2-morpholino-1-propan-1-one (Irgacure-907) or 2-benzyl-2-dimethylamino-1-(4-morpholinophenyl)-butan-1-one (Irgacure-369); an O-acyloxime-based compound such as Irgacure OXE 01 or Irgacure OXE 02 of Ciba Geigy Ltd.; a benzophenone-based compound such as 4,4'-bis(dimethylamino)benzophenone or 4,4'-bis(diethylamino)benzophenone; a thioxanthone-based compound such as 2,4-diethyl thioxanthone, 2-chloro thioxanthone, isopropyl thioxanthone or diisopropyl thioxanthone; a phosphine oxide-based compound such as 2,4,6-trimethylbenzoyl diphenyl phosphine oxide, bis(2,6-dimethoxybenzoyl)-2,4,4-trimethylpentyl phosphine oxide or bis(2,6-dichlorobenzoyl)propyl phosphine oxide; a coumarin-based compound such as 3,3'-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin or 10,10'-carbonyl bis[1,1,7,7-tetramethyl-2,3,6,7-tetrahydro-1H,5H,11H—Cl]-benzopyrano[6,7,81-ij]-quinolizin-11-one, or the like either alone or as a mixture of two or more, however, the photocuring agent is not limited thereto.

In addition, as the thermocuring agent, those known in the art may be used.

According to one embodiment of the present application, the metal salt may be a Li-containing inorganic salt, and the Li-containing inorganic salt may be a bis(trifluoromethane) sulfonimide lithium salt (LiTFSI).

The stretchable adhesive film provided in one embodiment of the present application further comprises a release film on at least one surface of a surface opposite to the surface adjoining the first adhesive layer of the substrate layer and a surface opposite to the surface adjoining the substrate layer of the first adhesive layer.

The release film is a film for protecting the substrate layer and the first adhesive layer that are very thin, and films having excellent mechanical strength, thermal stability, moisture barrier property, isotropy or the like may be used. For example, resin films of acetate-based such as polyethylene terephthalate (PET) or triacetyl cellulose (TAC), polyester-based, polyethersulfone-based, polycarbonate-based, polyamide-based, polyimide-based, polyolefin-based, cycloolefin-based, polyurethane-based, acryl-based, and the like may be used, however, the release film is not limited thereto as long as it is a commercially available silicone-treated release film.

As the release film adjoining the substrate layer according to the present application, a fluorine-based release film may be used, and as long as a releasing property of the substrate layer is secured, a silicone release film may also be used.

As the release film adjoining the first adhesive layer according to the present application, a fluorine-based release film may be used when the first adhesive layer is a silicone-based adhesive, and in other cases, a silicone-based or a fluorine-based release film may be used.

In the present application, an untreated PET film or an antistatic film may also be used as the release film as long as a releasing property is secured.

One embodiment of the present application provides a display device comprising the stretchable adhesive film according to one embodiment of the present application; a deposition layer provided on one surface of the stretchable adhesive film; and a substrate film provided on a surface opposite to the surface adjoining the stretchable adhesive film of the deposition layer, wherein the first adhesive layer of the stretchable adhesive film and the deposition layer adjoin each other.

In one embodiment of the present application, the substrate film may be selected from the group consisting of polyethylene terephthalate (PET), polyester, polycarbonate, polyimide, polyethylene naphthalate (PEN), polyether ether ketone (PEEK) polyarylate (PAR), polycyclic olefin (PCO), polynorbornene, polyethersulfone (PES) and a cycloolefin polymer (COP).

In another embodiment, the substrate film may be polyethylene terephthalate (PET) or a cycloolefin polymer (COP).

In one embodiment of the present application, the substrate film may have a thickness of greater than or equal to 10 μm and less than or equal to 100 μm, preferably greater than or equal to 15 μm and less than or equal to 90 μm, and more preferably greater than or equal to 20 μm and less than or equal to 75 μm.

In addition, the substrate film is preferably transparent. The meaning of the substrate film being transparent described herein represents light transmittance of visible light (400 nm to 700 nm) being 80% or higher.

In one embodiment of the present application, the deposition layer may be an organic deposition layer or an inorganic deposition layer.

In one embodiment of the present application, the deposition layer may comprise various inorganic barrier materials, and examples of the inorganic barrier material may comprise at least one type of metal selected from the group consisting of silicon (Si), aluminum (Al), indium (In), tin (Sn), zinc (Zn), titanium (Ti), copper (Cu), cerium (Ce) and tantalum (Ta), and metal compounds such as oxides, nitrides, carbides, oxynitrides or oxycarbides of the metals.

More specific examples of the metal compound may comprise metal oxides, metal nitrides, metal carbides, metal oxynitrides or metal oxyborides such as silicon oxide, aluminum oxide, titanium oxide, indium oxide, tin oxide, indium tin oxide (ITO), tantalum oxide, zirconium oxide, niobium oxide, aluminum silicate (SiAlOx), boron carbide, tungsten carbide, silicon carbide, oxygen-containing silicon carbide, aluminum nitride, silicon nitride, boron nitride, aluminum oxynitride, silicon oxynitride, boron oxynitride, zirconium oxyboride, titanium oxyboride and complexes thereof, diamond like carbon (DLC), and combinations thereof.

In addition, the deposition layer may comprise an organic layer comprising an organic polymer. In other words, the deposition layer may be a laminate of an inorganic layer comprising the inorganic barrier material and an organic layer In one embodiment of the present application, the display device means an organic light emitting device or an organic electronic device, and is not limited thereto as long as it is a stretchable display device.

One embodiment of the present application provides a wearable display device comprising the stretchable adhesive film.

The wearable display device means a display device wearable on the body, and specifically, may be used in a medical band or the like.

Hereinafter, the present disclosure will be described in detail with reference to examples so that those skilled in the art may readily implement the present disclosure. However, the present disclosure may be embodied in various different forms, and is not limited to the examples described herein.

PREPARATION EXAMPLE

Components, weight ratios and thicknesses of the substrate layer and the first adhesive layer of the stretchable adhesive film used as examples and comparative examples of the present application are described in the following Table 1.

TABLE 1

|  | Substrate Layer | Substrate Layer Thickness (μm) | First Adhesive Layer | First Adhesive Layer Thickness (μm) |
|---|---|---|---|---|
| Example 1 | LSR (9050 30P A:B = 10:1) | 125 | 2-EHA:AA = 98:2 | 25 |
| Example 2 | LSR (9050 30P A:B = 10:1) | 100 | 2-EHA:AA = 98:2 | 25 |
| Example 3 | LSR (9050 30P A:B = 20:1) | 100 | 2-EHA:AA = 98:2 | 25 |
| Example 4 | LSR (9050 30P A:B = 5:1) | 100 | 2-EHA:AA = 98:2 | 25 |
| Example 5 | LSR (9050 30P A:B = 10:1) | 125 | 2-EHA:AA = 96:4 | 25 |
| Example 6 | LSR (9050 30P A:B = 10:1) | 125 | 2-EHA:HEA:AA = 80:18:2 | 25 |
| Example 7 | LSR (9050 30P A:B = 10:1) | 125 | Silicone-based | 25 |

TABLE 1-continued

| | Substrate Layer | Substrate Layer Thickness (μm) | First Adhesive Layer | First Adhesive Layer Thickness (μm) |
|---|---|---|---|---|
| Example 8 | LSR (9050 30P A:B = 10:1) | 100 | Silicone-based | 50 |
| Example 9 | LSR (9050 30P A:B = 10:1) | 75 | Silicone-based | 75 |
| Comparative Example 1 | LSR (9050 30P A:B = 10:1) | 50 | 2-EHA:AA = 98:2 | 50 |
| Comparative Example 2 | TPU (Polycaprolactone-based) | 150 | 2-EHA:AA = 98:2 | 40 |
| Comparative Example 3 | LSR (9050 30P A:B = 10:1)/PET | 125 (LSR75/PET 50) | 2-EHA:AA = 98:2 | 25 |

In Table 1, a Xiameter 9050 30P material of Dow Corning was used as liquid silicone rubber (LSR), which means, as a two-component type, mixing main component A (Part A) and curing agent B (Part B) in a ratio of each of 20:1, 10:1 and 5:1, and TPU means a polyurethane-based material as a product of LG Chem.

1. Preparation of Stretchable Adhesive Film (Example 1)

As the substrate layer, components described in Example 1 of Table 1 were mixed in a described weight ratio, and the result was stirred and defoamed. After that, the mixed solution was coated on a fluorine releasing surface of TS502 (fluorine-based release film) of TACS, and then the result was dried for 5 minutes in a 150° C. oven so that the final thickness became the thickness described in Example 1 of Table 1.

After that, as the first adhesive layer, a curing agent was added to an acrylic resin in which components described in Example 1 of Table 1 were polymerized in a described weight ratio, then methyl ethyl ketone (MEK) was added thereto so that the solid content became 20%, and the result was stirred and defoamed. After that, the mixed solution was coated on a silicone releasing surface of RF02N (silicone release film) of SKC hi-tech&marketing (formerly SKC Haas), and then the result was dried for 3 minutes in a 120° C. oven so that the final thickness became the thickness described in Example 1 of Table 1. After that, the substrate layer and the first adhesive layer were laminated to prepare a stretchable adhesive film.

2. Preparation of Stretchable Adhesive Film (Examples 2 to 6)

Stretchable adhesive films were prepared in the same manner as in the preparation of stretchable adhesive film of Example 1 except that components, weight ratios and final thicknesses described in Examples 2 to 6 of Table 1 were used as the substrate layer, and components, weight ratios and final thicknesses described in Examples 2 to 6 of Table 1 were used as the first adhesive layer.

3. Preparation of Stretchable Adhesive Film (Stretchable Adhesive Films of Examples 7 to 9)

As the substrate layer, components described in each of Examples 7 to 9 of Table 1 were mixed in a described weight ratio, and the result was stirred and defoamed. After that, the mixed solution was coated on a fluorine releasing surface of TS502 (fluorine-based release film) of TACS, and then the result was dried for 5 minutes in a 150° C. oven so that the final thickness became the thickness described in each of Examples 7 to 9 of Table 1.

After that, 0.5 parts by weight of CAT-PL 50T, a platinum catalyst, was mixed to 100 parts by weight of KR-3700 resin of ShinEtsu Co., Ltd., and after dispersing the result into toluene so that the solid content became 20%, the result was coated on a fluorine release film. After that, the result was dried for 3 minutes in a 140° C. oven so that the final thickness became the thickness described in each of Examples 7 to 9 of Table 1. After that, the substrate layer and the first adhesive layer were laminated to prepare a stretchable adhesive film.

4. Preparation of Stretchable Adhesive Film (Stretchable Adhesive Films of Comparative Examples 1 and 2)

Stretchable adhesive film were prepared in the same manner as in the preparation of stretchable adhesive film of Example 1 except that components, weight ratios and final thicknesses described in Comparative Examples 1 and 2 of Table 1 were used as the substrate layer, and components, weight ratios and final thicknesses described in Comparative Examples 1 and 2 of Table 1 were used as the first adhesive layer.

5. Preparation of Stretchable Adhesive Film (Stretchable Adhesive Film of Comparative Example 3)

As the substrate layer, Part A and Part B of a Xiameter 9050 30P product described in Comparative Example 3 of Table 1 were mixed in a weight ratio of 10:1, and the result was stirred and defoamed. After that, the mixed solution was coated on a PET film, and then the result was dried for 5 minutes in a 150° C. oven to prepare a double layer structure so that the final thickness became the thickness described in Comparative Example 3 of Table 1.

After that, as the first adhesive layer, a curing agent was added to an acrylic resin in which components described in Comparative Example 3 of Table 1 were polymerized in a described weight ratio, then methyl ethyl ketone (MEK) was added thereto so that the solid content became 20%, and the result was stirred and defoamed. After that, the mixed solution was coated on a silicone releasing surface of RF02N (silicone release film) of SKC hi-tech&marketing (formerly SKC Haas), and then the result was dried for 3 minutes in a 120° C. oven so that the final thickness became the thickness described in Comparative Example 3 of Table 1. After that, the substrate layer having a double layer structure and the first adhesive layer were laminated to prepare a stretchable adhesive film.

For the stretchable adhesive films of Table 1, elongation and recovery evaluations were conducted under the condition of the following Table 2, and the results are as shown in the following Table 2.

TABLE 2

| | a1 (MPa) | a2 (MPa) | a2/a1*100 |
|---|---|---|---|
| Example 1 | 0.253 | 0.252 | 99.6 |
| Example 2 | 0.278 | 0.274 | 98.3 |

TABLE 2-continued

|  | a1 (MPa) | a2 (MPa) | a2/a1*100 |
|---|---|---|---|
| Example 3 | 0.103 | 0.102 | 99.8 |
| Example 4 | 0.495 | 0.495 | 100 |
| Example 5 | 0.247 | 0.244 | 98.8 |
| Example 6 | 0.25 | 0.246 | 98.4 |
| Example 7 | 0.261 | 0.254 | 97.3 |
| Example 8 | 0.197 | 0.194 | 98.5 |
| Example 9 | 0.132 | 0.126 | 95.5 |
| Comparative Example 1 | 0.11 | 0.102 | 92.7 |
| Comparative Example 2 | 1.932 | 1.804 | 93.4 |
| Comparative Example 3 | N/A | N/A | N/A |

1. a1: under 25±2° C. and 50±5% RH (relative humidity), both ends of each of the stretchable adhesive films of Examples 1 to 9 and Comparative Examples 1 to 3 were fixed in a length direction so that the width became 25 mm and the length became 165 mm, and then the stretchable adhesive film was stretched to a 20% strain and recovered once in a length direction at a rate of once per second. After that, the stretchable adhesive film was stretched to a 20% strain at a rate of 100 mm/min, and then recovered to the initial state in the opposite direction at a rate of 100 mm/min. Herein, the stress value reaching a 20% strain was measured as a1.

2. a2: under 25±2° C. and 50±5% RH (relative humidity), both ends of each of the stretchable adhesive films of Examples 1 to 9 and Comparative Examples 1 to 3 were fixed in a length direction so that the width became 25 mm and the length became 165 mm, and the stretchable adhesive film was stretched to a 20% strain and recovered 10,000 times in a length direction at a rate of once per second. After that, the stretchable adhesive film was stretched to a 20% strain at a rate of 100 mm/min, and then recovered to the initial state in the opposite direction at a rate of 100 mm/min. Herein, the stress value reaching a 20% strain was measured as a2.

A texture analyzer was used as a device measuring a1 and a2.

As shown in Examples 1 to 9 of Table 2, it was seen that the stretchable adhesive film of the present application had an a2/a1*100 value of 95 or greater, and from this, it was seen that recovery from elongation was excellent and durability was also very superior.

In Comparative Example 1 of Table 2, the substrate layer had a thickness of 50 μm, and had an a2/a1*100 value of 92.7, and from this, it was identified that recovery from elongation was reduced resulting in poor durability.

In Comparative Example 2 of Table 2, TPU (polycaprolactone-based) was used as the substrate layer, and as a polyurethane-based material, it was identified that this reduced recovery from elongation when used as the substrate layer of the stretchable adhesive film.

Comparative Example 3 of Table 2 presents a stretchable adhesive film forming a double substrate layer by further depositing a PET layer as the substrate layer, and as shown in the values of a1 and a2 (N/A) of Table 2, the stretchable adhesive film was broken when elongating to a 20% strain making the measurement impossible, and as a result, it was identified that the measurement of a2/a1 was not possible (N/A). In order to use a stretchable adhesive film in a stretchable display device and a wearable display device, a recovering property needs to be obtained even when a certain level of strain is applied, and it was identified that Comparative Example 3 of Table 2 was not suitable to be used in the display device.

In other words, when using the stretchable adhesive films of Examples 1 to 9 of Table 2 in a display device, it was identified that durability was excellent compared to when using the stretchable adhesive films of Comparative Examples 1 to 3 in a display device, and it was also identified that, by having an excellent recovering property from elongation, the stretchable adhesive films of Examples 1 to 9 were suitable to be used in a stretchable display device and a wearable display device.

The invention claimed is:

1. A stretchable adhesive film comprising:
   a substrate layer comprising an elastomer; and
   a first adhesive layer provided on one surface of the substrate layer,
   wherein the elastomer comprises silicone rubber,
   wherein the silicone rubber comprises one or more selected from the group consisting of methyl silicone, vinyl-methyl-silicone, phenyl-vinyl-methyl-silicone and fluoro-vinyl-methyl-silicone,
   wherein the first adhesive layer comprises one or more adhesives selected from an acryl-based adhesive, a silicone-based adhesive, a urethane-based adhesive and a rubber-based adhesive, and
   wherein the stretchable adhesive film satisfies Equation 1:

$$0.95 \leq a2/a1 \leq 1 \quad \text{[Equation 1]}$$

in the Equation 1,
   a1 is a stress value of the stretchable adhesive film at X1 under 25±2° C. and 50±5% RH; and
   a2 is a stress value at X1 after evaluating elongation/recovery on the stretchable adhesive film 10,000 times with a 20% strain under 25±2° C. and 50±5% RH;
   wherein X1 is a strain value (%) applied to the stretchable adhesive film;
   the strain means an elongational strain; and
   X1 is 20.

2. The stretchable adhesive film of claim 1, comprising a second adhesive layer on a surface of the substrate layer opposite to the surface contacting the first adhesive layer.

3. The stretchable adhesive film of claim 1, wherein the substrate layer has a thickness of greater than or equal to 60 μm and less than or equal to 150 μm.

4. The stretchable adhesive film of claim 1, wherein the first adhesive layer has a thickness of greater than or equal to 10 μm and less than or equal to 100 μm.

5. The stretchable adhesive film of claim 1, wherein the stretchable adhesive film has a thickness of greater than or equal to 70 μm and less than or equal to 250 μm.

6. The stretchable adhesive film of claim 1, wherein the first adhesive layer further comprises one or more agents selected from a crosslinking compound, a dispersant, a silane coupling agent, a photocuring agent, a thermocuring agent, a metal salt and a tackifier.

7. The stretchable adhesive film of claim 1, further comprising a release film on at least one surface of a surface of the substrate layer opposite to the surface contacting the first adhesive layer and a surface of the first adhesive layer opposite to the surface contacting the substrate layer.

8. A display device comprising:
   the stretchable adhesive film of claim 1;
   a deposition layer provided on one surface of the stretchable adhesive film; and
   a substrate film provided on a surface of the deposition layer opposite to the surface contacting the stretchable adhesive film of the deposition layer,
   wherein the first adhesive layer of the stretchable adhesive film and the deposition layer contact each other.

9. A wearable display device comprising the stretchable adhesive film of claim 1.

\* \* \* \* \*